Aug. 24, 1937. J. A. MacLEAN Re. 20,485

BOLT

Original Filed Dec. 2, 1930 2 Sheets-Sheet 1

Inventor:
John A. MacLean
By Williams, Bradbury
McCaleb & Hinkle,
Attys.

BOLT

Original Filed Dec. 2, 1930 2 Sheets-Sheet 2

Inventor:
John A. MacLean
By Williams, Bradbury, McCaleb & Hinkle.
Attys.

Reissued Aug. 24, 1937 Re. 20,485

UNITED STATES PATENT OFFICE 20,485

BOLT

John A. MacLean, Chicago, Ill., assignor to MacLean-Fogg Lock Nut Company, Chicago, Ill., a corporation of Illinois Original No. 1,946,800, dated February 13, 1934, Serial No. 499,561, December 2, 1930. Application for reissue February 7, 1936, Serial No. 62,780

4 Claims. (Cl. 85—9)

The present invention relates to bolts, and is particularly concerned with improvements in water-tight bolts for use in railway freight and passenger cars and industrial cars and the like.

While the present invention is of particular importance in connection with railway freight cars, it should be understood that the present bolt is capable of universal use and will be found advantageous wherever it is desirable to effect a waterproof or water-tight seal about the head of the bolt, or where it is desirable to utilize any of the other novel features of the bolt.

The railway freight cars of the prior art, which have their wooden sheathing secured by ordinary bolts, such as carriage bolts, are subject to the disadvantage that the wooden sheathing must be countersunk to receive the heads of the carriage bolts. In countersinking for the heads of the bolts, the edges around the countersunk holes are nearly always ragged and splintered. These ragged and splintered edges are the cause of loss and damage to lading contained in sacks, such as flour, sugar, cement, etc. It is, therefore, a desideratum in freight cars, that all fastening devices for sheathing, floors and any other portion of cars where bolts extend from inside to outside of cars, be installed with the heads flush with the surface of the wood. It also should be borne in mind that countersinking of the wood cuts a great deal of it away, thus materially decreasing its strength.

Another disadvantage of the prior art bolts is that water leaks in past the heads of the bolts so that the lumber soon begins to rot beneath the bolt head. The sheathing becomes loose, holes are formed in the sides and floors of the car, permitting leakage of the cargo such as grain, etc. The water which leaks past the bolt heads often causes damage to the cargo.

One of the objects of the present invention is the provision of an improved water-tight bolt of the same general type covered by my prior application, Serial No. 423,011, filed January 24, 1930.

Another object of the invention is the provision of an improved car construction including water-tight fastening devices for sheathing, flooring, roofing and other portions of cars where bolts extend from inside to outside, for the purpose of eliminating looseness and rotting of the lumber about the bolts.

Another object is the provision of an improved bolt having a head adapted to be drawn into sealing engagement with the lumber, so as to eliminate the difficulties brought about by leakage of water past the head of the bolt.

Another object is the provision of a bolt of the class described, in which the head is adapted to be drawn substantially flush with the wood surface, thus eliminating the operation of countersinking, which is necessary with carriage and other types of sheathing or flooring bolts, and to aid in effecting a waterproof seal about the head of the bolt.

Another object is the provision of a bolt for use in coal mine pit and conveying cars and the like. Cars of this class are fastened with carriage bolts, the heads of which project inside of the cars. In dumping the load, a great deal of coal is crushed and broken up by these carriage head bolts. This degrades the coal. With the use of the improved bolt, the inside surfaces of the cars would be smooth, thus eliminating breakage and degrading.

A further object of the invention is the provision of an improved wood bolt provided with a head having portions adapted to be drawn into the wood to form a fluid-tight seal, and also to prevent the bolt from turning.

A further object of the invention is the provision of an improved wood bolt provided with a head having, on its underside, a ridge around the shank, which is out of circular relation with respect to the center of the shank.

A further object of the invention is to provide a bolt with an improved shoulder on the shank adjacent the head.

A further object of the invention is to provide a bolt having an improved shoulder on the shank adjacent the head, and having a ridge on the underside of the head in such relation that the shoulder and ridge cooperate to ensure intertight seal between the head and wood to which the bolt is applied.

Other objects and advantages of the invention will be apparent from the following description and from the accompanying drawings in which similar characters of reference indicate similar parts throughout the several views, and in which:—

Fig. 13 is an elevational detail view of the upper end thereof.

Figure 1:
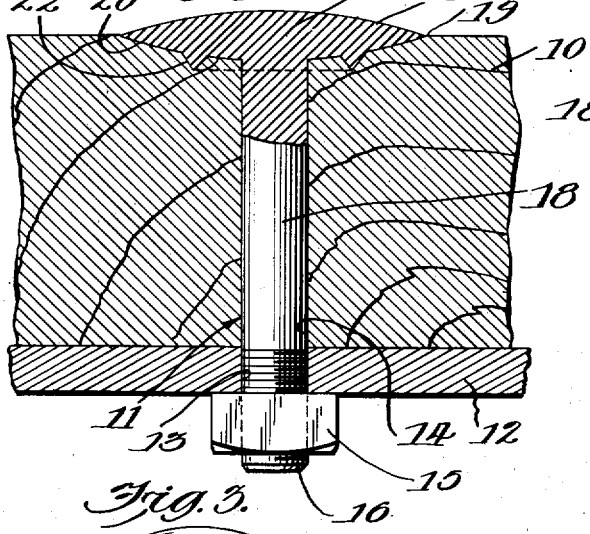
Figure 1 is a sectional view taken through a part of the railway car, showing wooden flooring or sheathing secured with a bolt constructed according to the present invention.

Referring to Fig. 1, this figure shows an installation which is exemplary of one of the many forms in which the invention may be utilized, the flooring or sheathing 10 being secured in place by a plurality of bolts 11, which pass through metal sills, braces, or framework 12. The present bolts may be used with any kind of lumber, but where a tight construction is desirable, some form of tongue and groove lumber is usually employed.

The metal supporting member 12 is provided with a bore 13 of sufficient size to receive the bolt 11 and the lumber may be bored with ordinary cylindrical holes 14 of the same size or preferably slightly smaller than the bolt 11. Any form of nut 15 or other threaded member may be employed, which is capable of cooperating with the complementary threaded portion 16 formed on the bolt 11, and it should be understood that, if desired, the threaded bore may be formed in the bolt, and the nut provided with a male threaded portion.

The bolt 11 preferably includes a head 17, a cylindrical body portion or shank 18, having a threaded portion 16. The head 17 is preferably circular in shape and tapered in thickness from the body of the bolt out towards the outer edge 19 of the head. Thus the lower surface 20 of the head slopes slightly upward away from the body or shank 18.

The top surface 21 of the head is preferably, but not necessarily, convexly curved, the curvature being slight in order to prevent the formation of projections on the surface of the lumber, but the curvature being sufficient to give sufficient body to the member for the necessary strength. It should be understood, however, that the shape of the upper surface of the head may be changed, while still utilizing the other features of the present invention, and the head may be made entirely flat at the surface 21, if desired.

The lower surface 20 of the head is provided with an integral ridge or camming formation 22, which preferably extends completely around the shank of the bolt so as to provide a water-tight seal in engagement with the woodwork 10. The ridge 22 is preferably V-shaped in cross section, although it may be made oval or any other shape which is capable of accomplishing the purposes herein set forth. The ridge is preferably arranged to compress the wood both inwardly and outwardly and thereby insure a water-tight seal.

The ridge 22 is located in non-circular relation with respect to the shank so that when the bolt is being tightened up, the engagement of the ridge with the wood is such that rotation of the bolt is prevented.

The apex or outermost edge of the ridge 22 may be in a plane so that it may make complete contact with the wood at or about the same time. The apex or outermost edge of the ridge 22 may, however, correspond to the shape of the under surface 21 of the bolt head 17. In this modification, the ridge will be drawn into effective contact with the wood before heavy turning forces are applied upon the shank by the nut 15.

Figure 2:
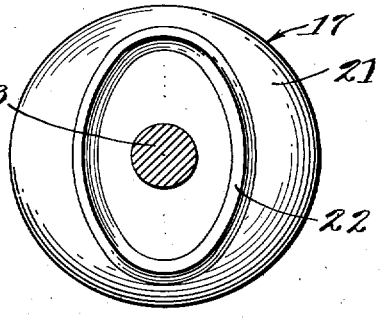
Fig. 2 is a sectional view of the bolt, taken on the plane of the line 2—2 of Fig. 1.

In the modification shown in Figs. 1 and 2, the ridge 22 is elliptical or oval in shape. It will readily be understood that when the ridge is drawn into the wood the portions between the major and minor axes being non-circular with respect to the axis of the bolt, or, in other words, oblique to the radial direction, effectively oppose rotation of the bolt. This opposition to rotation becomes greater as the bolt head is drawn into the wood.

Figure 3:
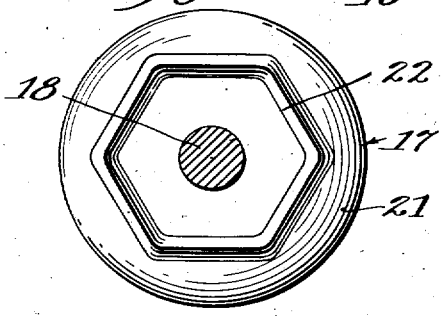
Fig. 3 is a similar view of a modified form of bolt.

In the modification shown in Fig. 3, the ridge is of hexagonal shape. In this form the angular portions of the figure provide abutments which engage the angular portions of the recess formed by the ridge. Since these angular portions are located at a substantial distance from the axis, the opposition to rotation thus provided is very considerable.

Figure 4:
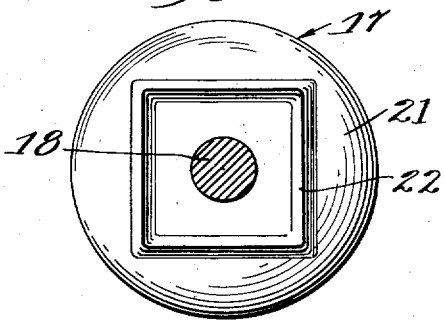
Fig. 4 is a similar view of a modified form of bolt.

In the modification shown in Fig. 4, the ridge is in the form of a square. This modification provides the ridge with smaller angles which increase the resistance to rotation.

Figure 5:
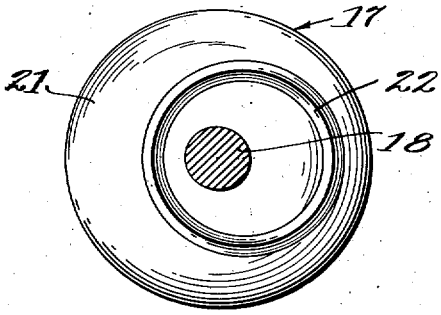
Fig. 5 is a similar view of a modified form of bolt.
Figure 6:
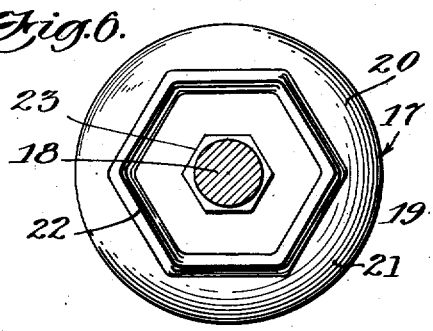
Fig. 6 is a similar view of a modified form of bolt, taken on the line 6—6 of Fig. 7.

In the modifications described above, the figures formed by the ridge have been symmetrically arranged with respect to the axis. They may, however, be unsymmetrically arranged, if desired, and the resistance to rotation thereby increased. In Fig. 5 is illustrated an embodiment in which the ridge is circular and is eccentrically arranged with respect to the shank.

It is to be understood that the various forms of ridges shown and described are merely exemplary of the invention, and the invention is not intended to be limited to the specific forms shown, since it contemplates broadly a ridge forming a continuous figure around the shank, which figure is in non-circular relation to the shank.

Since the ridge 22 prevents rotation of the bolt during tightening, the complete shank of the bolt may be round in cross section, and it is not necessary to form the upper part thereof into non-round cross section, or provide other means for preventing rotation of the bolt, although such expedients may be employed, if desired.

In Figs. 6 to 12 I have shown bolts having various forms of shoulders which are adapted to ensure a water-tight seal with the wood. The bolt shown in Figs. 6 and 7 has a shoulder 23 of hexagonal cross section which is driven into the wood when the bolt is applied. The wood is broken up to a much less extent than is the case when the usual square shoulders are employed. It is preferred to provide a camming ridge 22 on the underside of the head 21 of the same configuration as the shoulder 23, but this is not essential and the modified form of shoulder contemplated by the invention may be employed on bolts having ridges of the same or different configuration, or bolts without ridges at all. Where the bolt is provided with a ridge 22, the wood displaced by the shoulder 23 is pressed outwardly towards the ridge and consequently the wood between the ridge and shoulder is compressed so as to ensure a tight seal.

Figure 7:
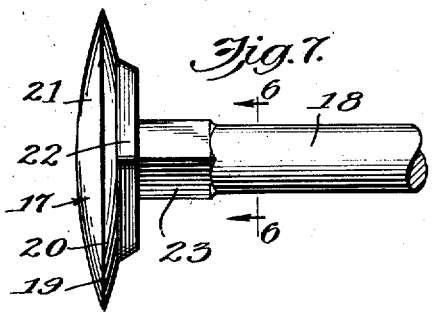
Fig. 7 is an elevational detail view of the upper end thereof.
Figure 8:
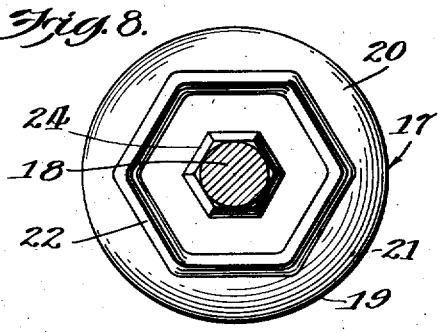
Fig. 8 is a sectional view of a modified form of bolt taken on the line 8—8 of Fig. 9.
Figure 9:
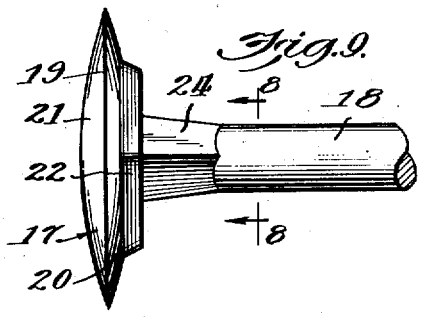
Fig. 9 is an elevational detail view of the upper end thereof.

In the form shown in Figs. 7 and 8, a shoulder 24 of hexagonal cross section is provided, in conjunction with a ridge 22, which, by way of example, is shown as of hexagonal configuration. As will be seen from Fig. 8 the shoulder 24 tapers inwardly away from the head 17 so that, when the bolt is driven into the wood, the sloping sides displace the wood in the radial direction and makes a very tight seal.

Figure 10:
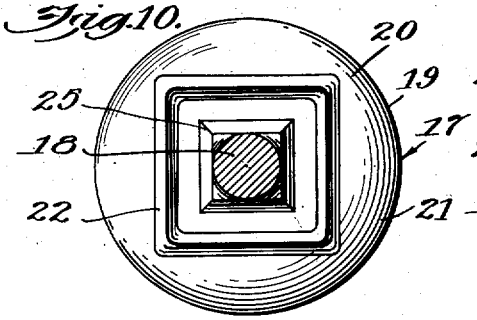
Fig. 10 is a sectional view of a modified form of bolt taken on the line 10—10 of Fig. 11.
Figure 11:
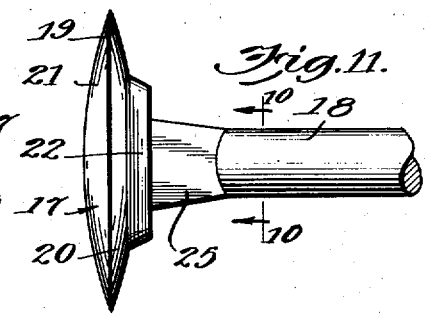
Fig. 11 is an elevational detail view of the upper end thereof.

It will be understood that I do not intend to be limited to a tapered shoulder of any particular cross section, since tapered shoulders of any cross section exert a beneficient camming action. In Figs. 10 and 11, I show a bolt having a tapered shoulder 25 of square cross section, and by way of example, a square ridge 22 arranged so that the sides of the shoulder and the inner sides of the ridge compress the wood between them.

Figure 12:
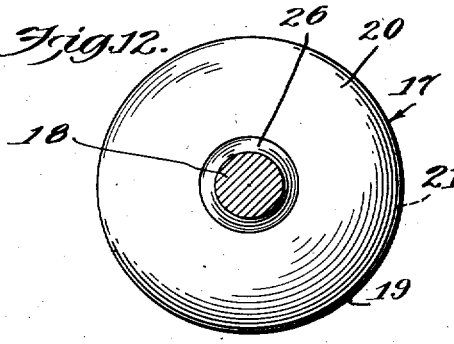
Fig. 12 is a sectional view of a modified form of bolt taken on the line 12—12 of Fig. 13.
Figure 15:
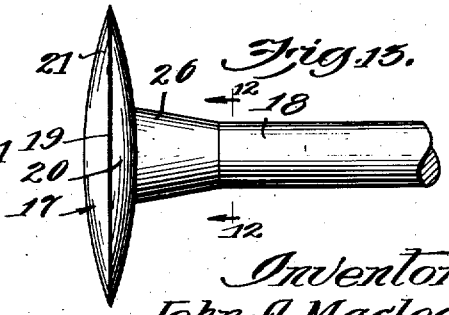

In Figs. 12 and 13, I have shown a bolt having a tapered shoulder 26 of round cross section. By way of example, the head may not be provided with a ridge, although a ridge of any configuration may be provided on the underside of the head 17, if desired. The shoulder 26, being frusto-conical in shape, exerts considerable pressure on the adjacent wood without fracturing the fibers, and consequently serves to a great extent to maintain a watertight seal around the bolt.

The operation and installation of the present bolt is as folows:

The lumber 10 is preferably provided with a bore 14 slightly smaller than the body 18 of the bolt, to provide a close fit, and the bolt 11 may be driven into the bore as far as possible with a hammer or other driving tool. The nut 15 may then be placed upon the threaded portion 16 of the bolt, and the nut threaded home by means of a wrench or other tool, during which operation the bolt will be gradually drawn into the bore 14, the head embedding itself in the surface of the lumber about the bore 14, until the head is substantially flush with the surface of the lumber. During this operation, the ridge 22 is drawn into the lumber, and since it is located in non-circular relation to the shank, rotation of the bolt is prevented.

The ridge 22 compresses the fibers of the lumber, and since such ridge is in the form of a continuous figure, a zone of compressed fibers is provided around the shank, thereby insuring a substantially perfect waterproof seal. Where the bolt is provided with a shoulder of the type shown or an equivalent shoulder, the shoulder displaces part of the wood outwardly towards the ridge 22, increasing the sealing pressure acting on the wood and providing a superior seal.

The nut 15 and thread 16 constitute a force multiplying device for effecting the sealing engagement between the head and the lumber, as well as means for permanently securing these parts in sealing engagement, and any kind of nut, including lock nuts or lock washers, may be employed for this purpose.

It will thus be observed that I have invented an improved bolt, which has peculiar advantages when used in connection with refrigerator cars, for the reason that it is highly desirable to avoid leakage of water into the holes about the bolts in such cars. The present bolts effect a substantial improvement in the life and serviceability of the cars which are equipped with such bolts, and the bolts are adapted to prevent leakage and enable the lumber to give good service for a much longer period of time than the devices of the prior art. When the present bolts are employed with relatively hard wood, the heads of the bolt provide a perfectly waterproof seal, which prevents water from leaking through the floor, damaging the installation and rotting the lumber.

It is of the utmost importance that the insulation of refrigerator cars be kept dry in order to maintain the insulating value, and particularly on account of the fact that the insulation is enclosed between the walls of the car where it will not dry out very quickly, should it ever become wet.

While I have illustrated preferred embodiments of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An article of manufacture, comprising a replacement bolt for wood holes comprising a bolt shank having a head, force multiplying means carried by the end of said shank for drawing the head into engagement with the wood of a member secured by said bolt, said shank having a non-circular tapered portion adjacent said head, and having wedging surfaces, said tapered portion of the shank increasing in size from the shank to the head and being adapted to be wedged into a worn wood hole to contact the food fibers surrounding the upper end of the hole, said head comprising a circular member tapering gradually from its center toward its outer edges and adapted to be drawn into the wood substantially flush with the upper surface thereof, and a non-circular ridge having its sides parallel to the said wedging surfaces, substantially V-shaped in cross-section, carried by the lower side of the head for effecting a water-tight seal between the head of the bolt and the adjacent wood, said ridge being adapted to prevent rotation of the bolt and cooperating with the wedging surfaces to cam the intermediate wood fibers when being drawn up.

2. An article of manufacture comprising a water-tight bolt for wood comprising a bolt shank having a head, force multiplying means carried by the end of said shank for drawing the head into engagement with the wood of a member secured by said bolt, said shank having an elongated tapered portion adjacent said head, said tapered portion of the shank increasing in size from the shank to the head and being adapted to be wedged into a hole in the wood to compress the wood fibers surrounding that end of the hole, said head comprising a member adapted to be drawn into the wood substantially flush with the outer surface of the wood, and having a non-circular ridge on its lower side, said ridge being substantially V-shaped in section and adapted to cooperate with said tapered portion on said shank to effect a water-tight seal between the head of the bolt and the adjacent wood.

3. An article of manufacture comprising a water-tight bolt for wood comprising a bolt shank having a head, force multiplying means carried by the end of said shank for drawing the head into engagement with the wood of a member secured by said bolt, said shank having an elongated tapered portion adjacent said head, said tapered portion of the shank increasing in size from the shank to the head and being adapted to be wedged into a hole in the wood to compress the wood fibers surrounding that end of the hole, said head comprising a member adapted to be drawn into the wood substantially flush with the outer surface of the wood, and having a ridge on its lower side, said ridge being substantially V-shaped in section and adapted to cooperate with said tapered surface on said shank to effect a water-tight seal between the head of the bolt and the adjacent wood, said ridge being non-circular in plan and adapted to prevent rotation of the bolt when the bolt is being drawn into engagement with the wood.

4. A bolt for the purpose described, having a threaded cylindrical body and a head on which is a downwardly extending flange terminating in a cutting edge, said bolt being provided adjacent its head with a non-circular part projecting beyond the body and extending below said flange, the under surface of said head being tapered to provide an inclined face extending from said flange to the non-circular part and opposing the inner wall of said flange to compress the material to which the bolt is applied and thereby form a water-tight joint.

JOHN A. MACLEAN.